Patented Nov. 6, 1928.

1,690,783

UNITED STATES PATENT OFFICE.

KARL HEUSNER AND MAX SIMON, OF LEVERKUSEN, NEAR COLOGNE-ON-THE-RHINE, GERMANY, ASSIGNORS TO GRASSELLI DYESTUFF CORPORATION, OF NEW YORK, N. Y., A CORPORATION OF DELAWARE.

PROCESS OF PRODUCING AZO DYESTUFFS.

No Drawing. Application filed June 7, 1927, Serial No. 197,220, and in Germany April 6, 1925.

This application is a continuation in part of our application Ser. No. 97,759, filed March 26, 1926, and relates to the preparation of azo dyestuffs by coupling β-naphthyl-sulfaminic acid and its derivatives such as the chloro, alkyl and sulfonic acid derivatives with diazo compounds.

By the use of the sulfaminic acids the reaction proceeds usually very uniformly producing the dyestuffs with excellent yields and eliminating the formation of undesirable by- or decomposition products. This is particularly valuable if it is desired to obtain the corresponding dyestuffs with the free amino group, as we have further found that the sulfo group of the sulfaminic acid can be easily eliminated, as for instance, by boiling the sulfaminic azo compounds in aqueous solution with dilute mineral acids. By this procedure better yields and more uniform products are obtained than when coupling directly the free amino compound with the respective diazo compound.

The following examples will further illustrate our invention, the parts being by weight:

1. 17.3 parts by weight of p-sulfanilic acid are diazotized and coupled with 24.5 parts by weight of β-naphthyl-sulfaminic acid sodium salt in an ice cold aqueous solution thereof containing 28 parts by weight of sodium carbonate. The reaction mixture is stirred for several hours until the coupling is complete. The resulting dyestuff with the sulfaminic group intact can be isolated in the well known way by salting out and dried without decomposition. The dyestuff in dry powdered form has brick-red color and dyes wool an orange color. The sulfo group may be split off by heating with dilute hydrochloric acid. The dyestuff in its free state has probably the formula:

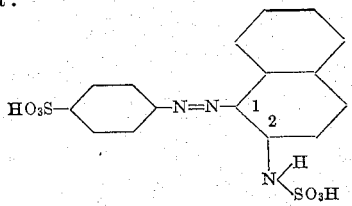

2. 17.3 parts by weight of m-sulfanilic acid are diazotized and coupled with 34.7 parts by weight of 2-naphthyl-sulfaminic-6-sulfonic acid sodium salt in an aqueous reaction mixture containing 28 parts by weight of sodium carbonate at 0° C. After several hours when the coupling is complete the dyestuff with the sulfaminic group intact may be salted out of the yellowish orange solution and dried, giving a yellowish orange powder. The dyestuff dyes wool a yellowish orange color. The sulfo group of the sulfaminic group may be split off by heating with dilute hydrochloric acid. The dyestuff has probably the formula:

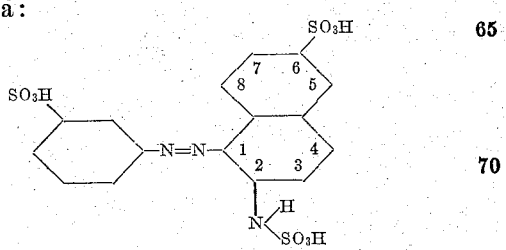

We claim:

1. As new products, monoazo dyestuffs obtained by coupling diazo compounds with a β-naphthyl-sulfaminic acid compound, being, when dried and pulverized, generally reddish to yellowish-orange powders, dyeing wool in orange to yellowish-orange shades.

2. As a new product, the monoazo dyestuff having in its free state most probably the formula:

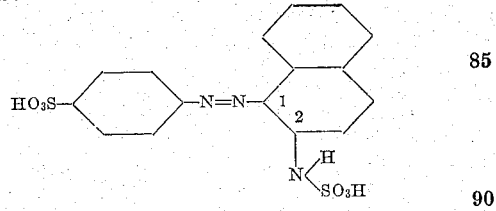

said dyestuff, in dry powdered form, being a brick-red powder dyeing wool an orange color.

In testimony whereof, we affix our signatures.

KARL HEUSNER.
MAX SIMON.